United States Patent
Jones

(10) Patent No.: US 7,715,316 B2
(45) Date of Patent: May 11, 2010

(54) METHOD AND APPARATUS FOR IMPROVING PERFORMANCE IN A NETWORK USING A VIRTUAL QUEUE AND A SWITCHED POISSON PROCESS TRAFFIC MODEL

(75) Inventor: Lawrence W. Jones, Woburn, MA (US)

(73) Assignee: Verizon Services Organization Inc., Irving, TX (US)

( * ) Notice: Subject to any disclaimer, the term of this patent is extended or adjusted under 35 U.S.C. 154(b) by 348 days.

(21) Appl. No.: 11/798,242

(22) Filed: May 11, 2007

(65) Prior Publication Data

US 2008/0279207 A1 Nov. 13, 2008

(51) Int. Cl.
H04L 12/56 (2006.01)
(52) U.S. Cl. .................... 370/232; 370/412; 709/232
(58) Field of Classification Search ......... 370/229–334, 370/412–418, 428; 709/223–226
See application file for complete search history.

(56) References Cited

U.S. PATENT DOCUMENTS

| | | | | |
|---|---|---|---|---|
| 5,343,465 | A | * | 8/1994 | Khalil .................... 370/232 |
| 6,526,259 | B1 | * | 2/2003 | Ho .......................... 455/67.11 |
| 2008/0013449 | A1 | * | 1/2008 | Rodriguez et al. .......... 370/229 |
| 2008/0151923 | A1 | * | 6/2008 | Ignatowski et al. ......... 370/412 |
| 2008/0159129 | A1 | * | 7/2008 | Songhurst et al. ........... 370/229 |

OTHER PUBLICATIONS

Paulo Salvador, R. Valades, A. Pacheco, "Multiscale Fitting Procedure using Markov Modulated Poisson Process," 9th IFIP Working Conference, Jun. 27-29, 2003.
A.W. Berger, "On the index of dispersion of counts for user demand modeling," presented to ITU Madrid Spain Jun. 27-29, 1994, AT&T Study Group 2, Question 17/2.
Will Leland, Murad Taqqu, Walter Willinger, and Daniel Wilson, On the Self-Similar Nature of Ethernet Traffic (Extended Version), IEEE/ACM Transactions on Networking, vol. 2, No. 1, pp. 1-15, Feb. 1994.
A. Andersen and B. Nielsen, "A Markovian Approach to Modeling Packet Traffic with Long Range Dependence," IEEE JSAC, 16(5):719-732, 1998.
Jones, Lawrence, W., "Multi-Timescale Markov Modulated Poisson Process (MMPP) Modeling of Internet Access Traffic", Boston University Dissertation, published Oct. 3, 2006.

* cited by examiner

*Primary Examiner*—William Trost, IV
*Assistant Examiner*—Roberta A Shand

(57) ABSTRACT

A method for improving network performance using a virtual queue is disclosed. The method includes measuring characteristics of a packet arrival process at a network element, establishing a virtual queue for packets arriving at the network element, and modeling the packet arrival process based on the measured characteristics and a computed performance of the virtual queue.

36 Claims, 10 Drawing Sheets

METHOD AND APPARATUS FOR IMPROVING PERFORMANCE IN A NETWORK USING A VIRTUAL QUEUE AND A SWITCHED POISSON PROCESS TRAFFIC MODEL

BACKGROUND INFORMATION

Traffic modeling plays a fundamental role in traffic engineering of telecommunications networks, whether they be circuit switched or packet switched, voice or data. In the Public Switched Telephone Network (PSTN), Erlang models have been widely used for trunk engineering and sizing. Application of traffic models to packet-switched environments, including broadband packet-switched environments, has been more difficult and, thus, remains an active area of research.

Packet-switched networks include terminals connected via access lines to a packet switched infrastructure comprised of network elements or nodes connected to one another. Network elements (e.g., routers, switches, multiplexers, etc.), located at various points in a network, may provide switched or routed connections between terminals. Messages may be transferred between terminals as sequences of packets. Native link layer protocols, such as Asynchronous Transfer Mode (ATM), Frame Relay, and Ethernet, and network layer protocols, such as Internet Protocol (IP) traversing broadband link layer subnets, may be used to format and decode packets. Upon receiving a packet, a network element may determine the next node in the transmission path and then place the packet in a queue for transmission.

The arrival of packets at a given network element may be a random process. Accurate traffic models of the arrival process assist network engineers in making effective capacity decisions regarding bandwidth and buffer resources in network elements. Thus, accurate traffic models allow efficient use of bandwidth and buffer resources and minimize network costs.

A switched Poisson process (SPP) is a traffic model that may be used to represent a packet arrival process. An SPP is a special case of a Markov-modulated Poisson process (MMPP). An MMPP is a time-varying Poisson process that "modulates" among different phases. In general, an N-phase MMPP has Poisson-distributed packet arrivals with arrival rate $\lambda_j$, when the MMPP is in phase j, where $1 \leq j \leq N$. For example, a three-phase MMPP is Poisson with an arrival rate modulating among $\lambda_1$, $\lambda_2$, and $\lambda_3$ during phases one, two, and three, respectively. Rates of transition between different phases are governed by a Markov chain. An SPP is a two-phase MMPP and, therefore, alternates between two rates, $\lambda_1$ and $\lambda_2$, in accordance with transition rates, q1 and q2, from phase one to two, and two to one, respectively.

It would therefore be desirable to provide a network element capable of accurately modeling a packet arrival process and, in particular, capable of estimating parameters $\lambda_1, \lambda_2, q_1,$ and $q_2$ of an SPP traffic model.

DETAILED DESCRIPTION OF PREFERRED EMBODIMENTS

Reference will now be made in detail to the exemplary embodiments, which are illustrated in the accompanying drawings. Wherever possible, the same reference numbers will be used throughout the drawings to refer to the same or like parts. While the description includes exemplary embodiments, other embodiments are possible, and changes may be made to the embodiments described without departing from the spirit and scope of the invention. The following detailed description does not limit the invention. Instead, the scope of the invention is defined by the appended claims and their equivalents.

In an exemplary embodiment, methods and systems model a packet arrival process associated with packets arriving at a network element (e.g. switch or router). For example, the exemplary methods and systems measure characteristics of the packet arrival process. The measured characteristics may include an average packet arrival rate, a packet tally, and buffer occupancy values in a virtual queue. Parameters of a model of the packet arrival process may be estimated based on the measured characteristics. Based on the estimated model parameters, an impact of changing the buffer and/or bandwidth capacity resources of the network element may be predicted, Moreover, the network element resources may be dimensioned to provide the required performance for the traffic that traverses that network element. For example, buffer capacity and/or link capacity associated with one or more egress ports in the network element may be either increased if it is determined that insufficient resources were available for a given traffic demand, or decreased to save on cost if it is deemed that the observed packet arrival process could be accounted for with less buffer and/or bandwidth capacity.

Figure 1A:
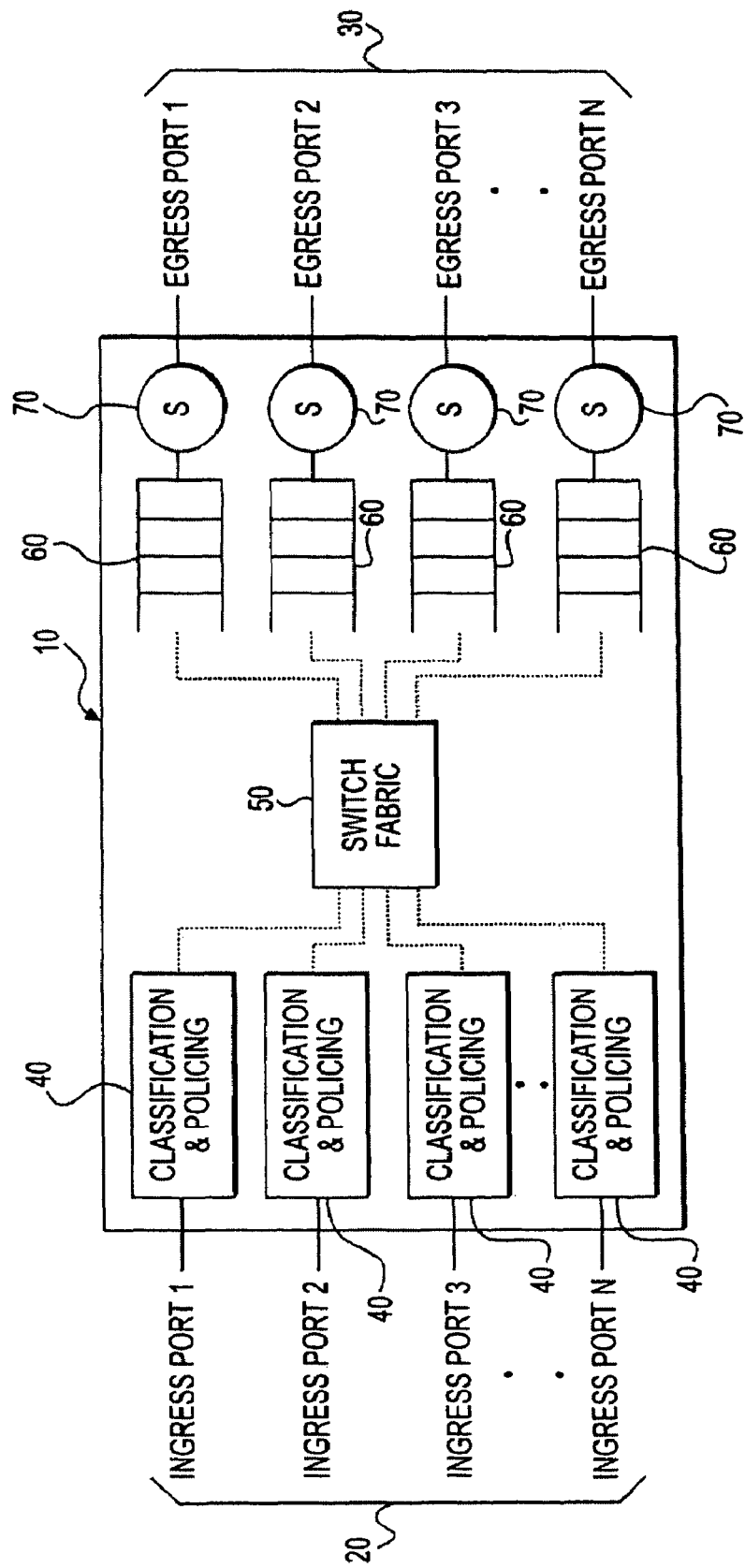
FIG. 1A is a functional block diagram of a network element architecture.

FIG. 1A is a functional block diagram of an exemplary network element architecture. A network element 10, which may be a router, switch, or multiplexer, may receive packets via ingress ports 20 and may transmit packets via egress ports 30. Packets arriving at an ingress port 20 may be classified and policed by classification and policing processors 40, then forwarded to a particular egress port 30 via a switch fabric 50, egress queues 60, and schedulers 70. Classification processors may determine a priority level or more generally, a Class of Service (CoS). Policing processors may be used to ensure that incoming traffic conforms to contracted levels when traffic conformance is part of the service definition and protect the network from attempts at malicious use of network bandwidth resources. An egress queue destination for each arriving packet may be derived based on routing information and CoS. The routing information may include address information included in the packets, a routing/forwarding table directing switch fabric 50, and may be nominally constructed by operation of a routing protocol (e.g., Routing Information Protocol (RIP), Open Shortest Path First (OSPF), Private Network to Network Interface (PNNI), etc.) and/or a user provisioned explicit policy. A particular pair of ingress and egress ports 20, 30 corresponding to a transmitter/receiver pair may commonly be referred to as a single physical port, input/output port, I/O port, or just interface port for short. In certain embodiments, network element 10 may be a multiplexer, which is a special case of a router or switch having one primary physical port, sometimes referred to as the uplink, to which all other ports forward (upstream directed) packets to, and receive (downstream directed) packets from.

Figure 1B:
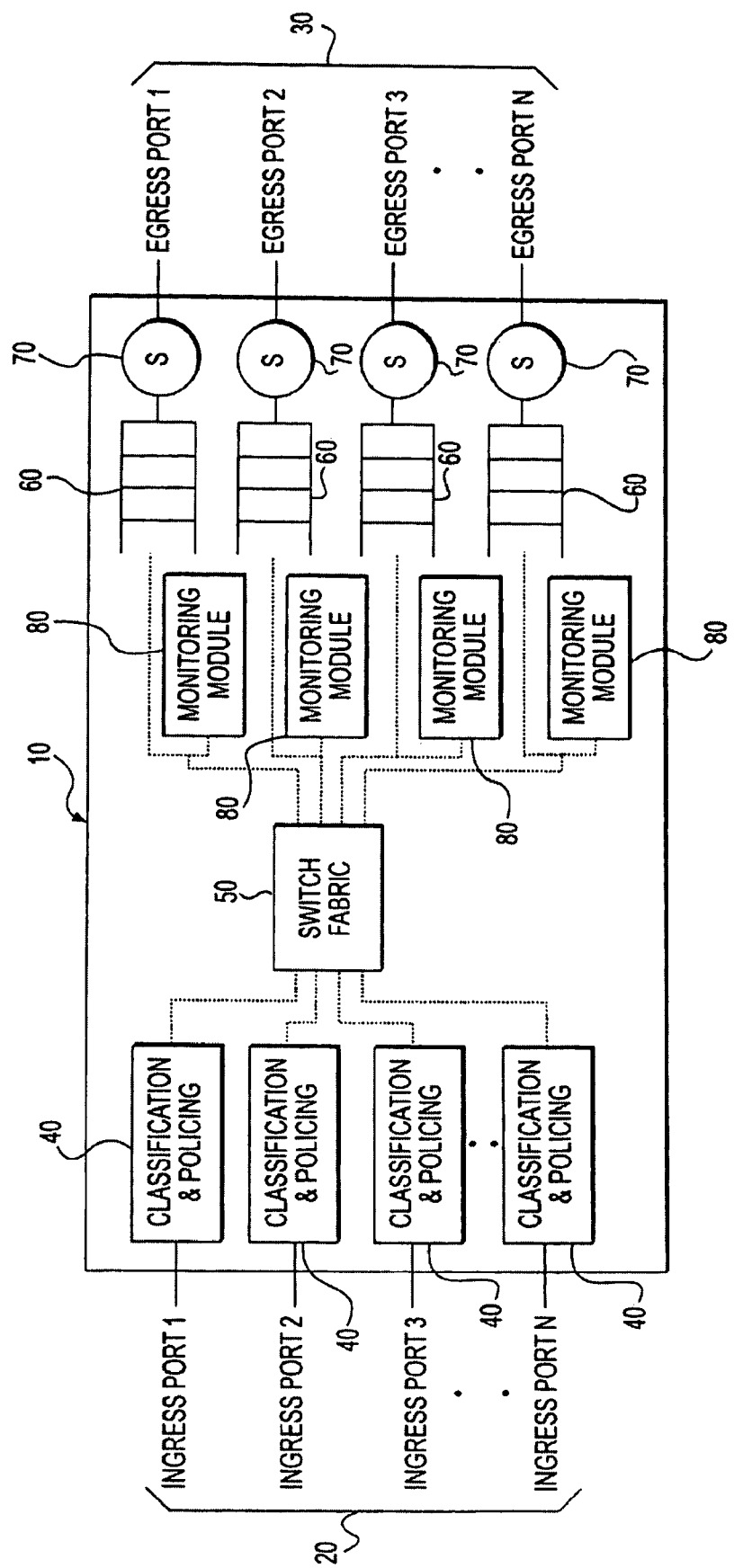
FIG. 1B is a functional block diagram of an exemplary embodiment of the network element architecture of FIG. 1A configured with monitoring modules.

FIG. 1B depicts an exemplary embodiment as applied to the network element architecture depicted in FIG. 1A. In the exemplary embodiment shown dedicated monitoring modules 80 may be added between switch fabric 50 and each egress queue 60 to monitor and measure characteristics of packet arrival processes associated with packets flowing into individual egress queues 60. As mentioned previously, classification processors may classify according to a priority or CoS policy and, therefore, packet arrival processes at each egress queue 60 may differ. To accommodate the different packet arrival processes per a CoS policy, monitoring modules 80 may be implemented at each egress queue of each egress port in each network element 10 of a packet-switched network. In certain embodiments, monitoring modules 80 may be embedded on the same circuit board, Application Specific Integrated Circuits (ASICs), chipset, or firmware, or as any other hardware and/or software combination. In addition, monitoring modules 80 may be integrated with other hardware and/or software elements in network element 10.

Figure 2A:
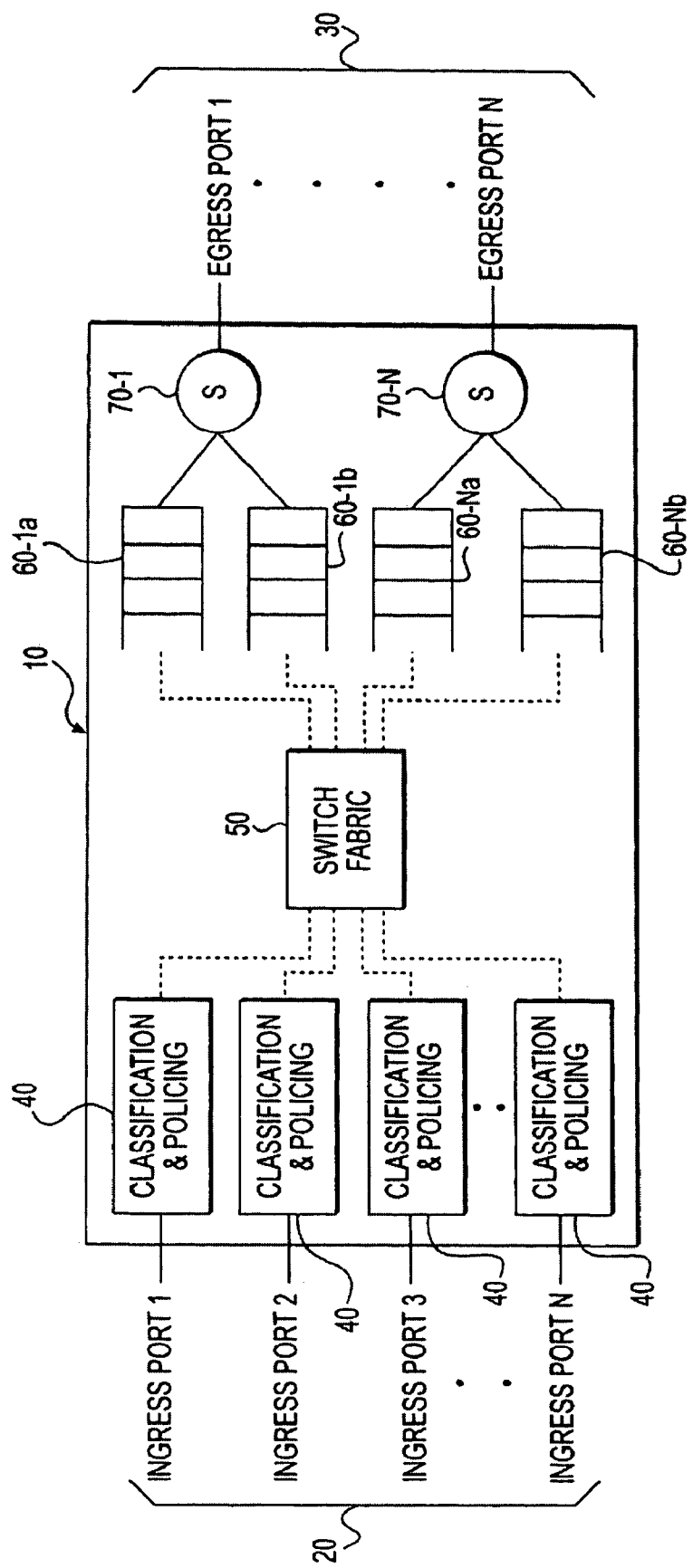
FIG. 2A is a functional block diagram of a second network element architecture.
Figure 2B:
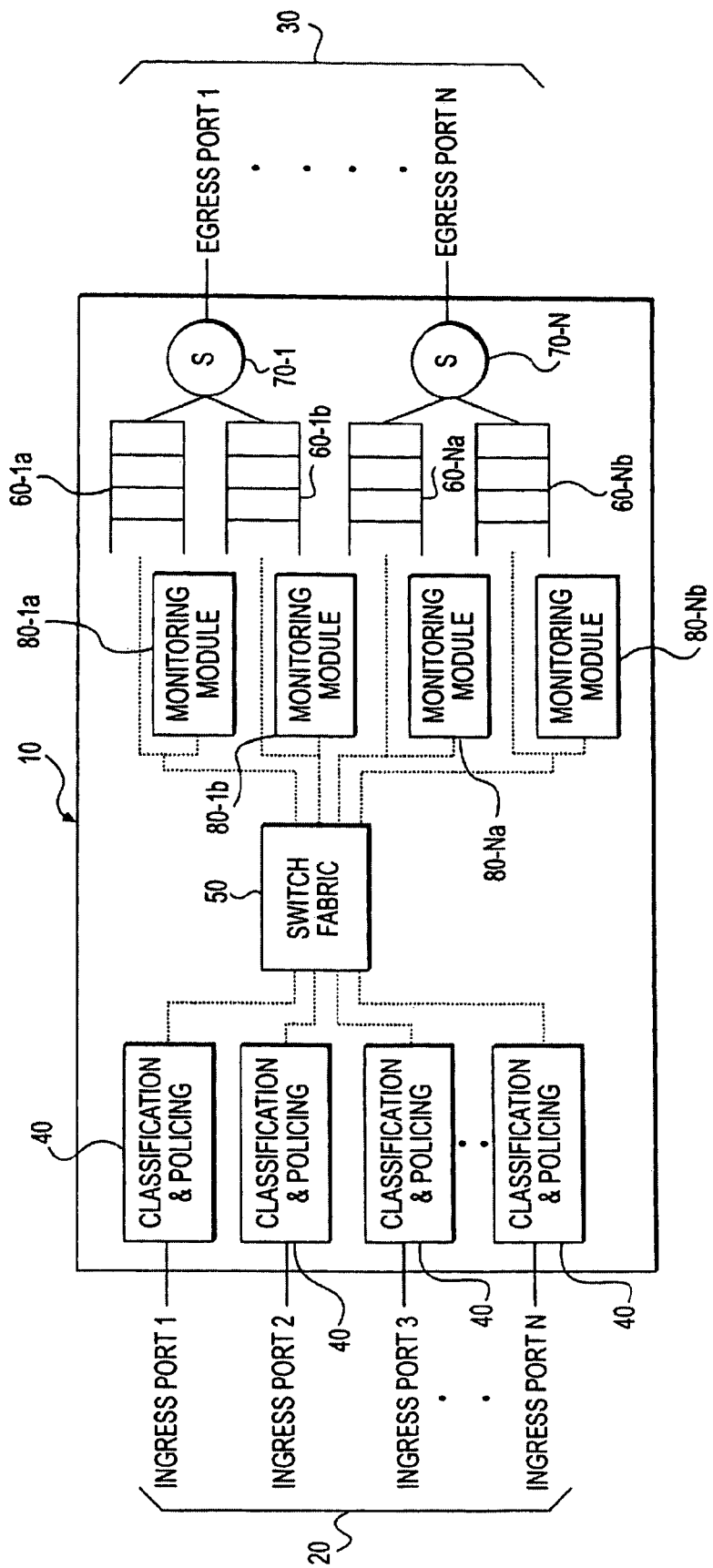
FIG. 2B is a functional block diagram of a second exemplary embodiment of the network element architecture of FIG. 2A configured with monitoring modules.

FIGS. 1A and 1B illustrate a configuration of network element 10 wherein each egress port 30 transmits packets from a single egress queue 60 implementing simple First-In-First-Out (FIFO) queuing. Alternatively, a network element may implement multiple egress queues per egress port to support Class of Service (CoS) differentiation for different service/application types. FIGS. 2A and 2B depict one such configuration.

In FIG. 2A, each scheduler 70 may select an egress queue 60 from which to transmit a next packet according to a scheduling policy. One example of such a policy is a fixed priority scheduling scheme. In such a scheme, egress queues feeding to a common scheduler 70 may be assigned fixed priorities. For example, egress queue 60-1*a* may be assigned a higher priority than egress queue 60-1*b* and similarly for egress queues 60-2*a* and 60-2*b* (not shown), egress queues 60-3*a* and 60-3*b* (not shown), and so on through egress queues 60-Na and 60-Nb. Under such a configuration, each egress port scheduler 70 may always transmit a packet from its highest priority queue if the highest priority queue is not empty and may attempt to transmit a packet from its lower priority queue only if the highest priority queue is empty. The fixed priority scheduling scheme described for two egress queues per egress port, as depicted in FIG. 2A, may be extended to a network element having more than the two egress queues per egress port. Moreover, other scheduling policies may be implemented (e.g., Weighted Fair Queuing, Deficit Weighted Round Robin, etc).

FIG. 2B depicts another exemplary embodiment as applied to the network element architecture depicted in FIG. 2A. As in FIG. 1B, dedicated monitoring modules 80 may be added between switch fabric 50 and each egress queue 60 to monitor and measure characteristics of packet arrival processes associated with packets flowing into individual egress queues 60. Thus, regardless of scheduling policy or number of egress queues 60 per egress port 30, a dedicated monitoring module 80 may be applied to each individual egress queue 60.

Figure 3:
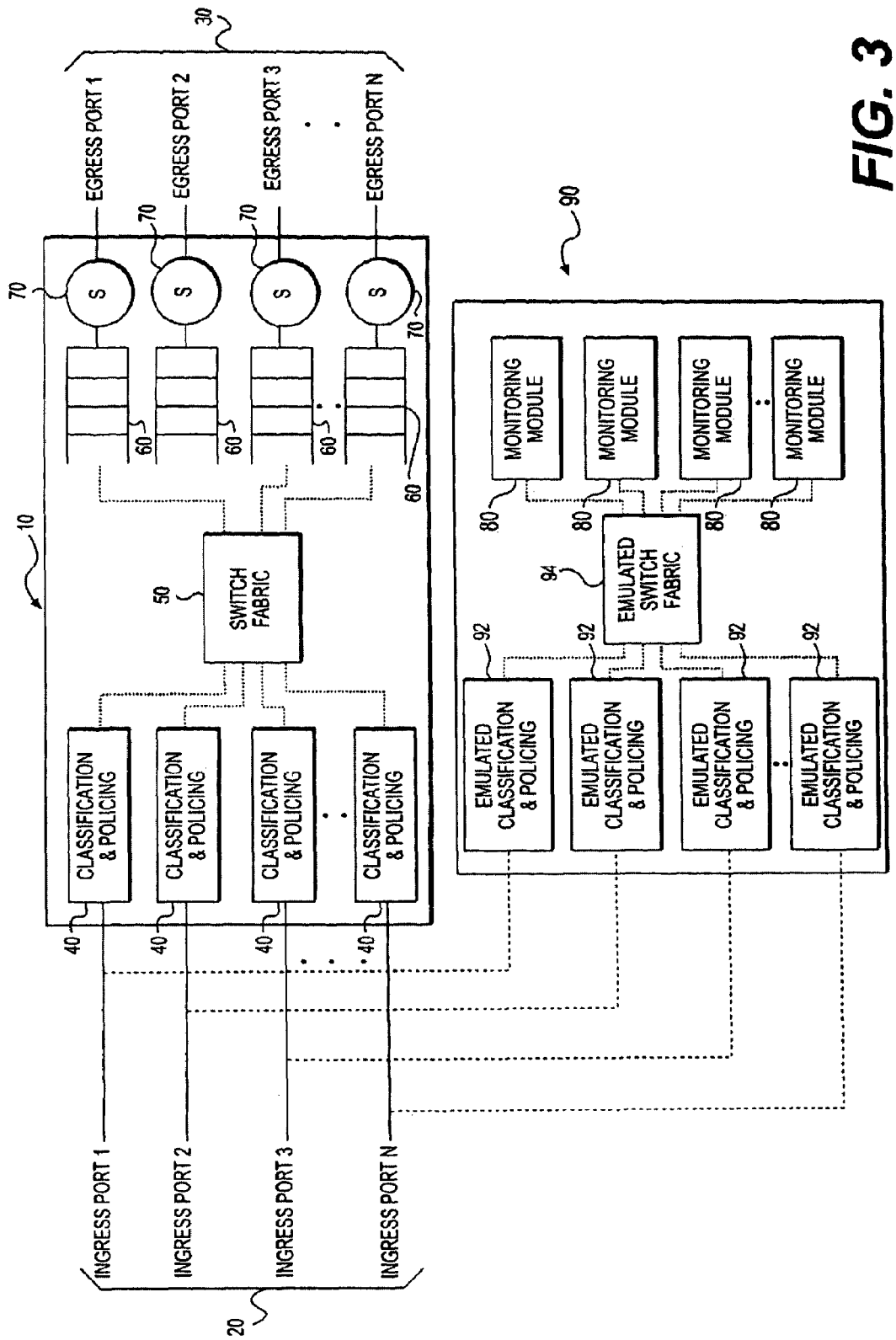
FIG. 3 is a functional block diagram of a third network element architecture configured with monitoring modules.

FIG. 3 depicts an alternative embodiment wherein monitoring modules 80 may be implemented external to network element 10 in an external monitoring apparatus 90. To infer distinct packet streams arriving at each egress queue 60 of network element 10, external monitoring apparatus 90 may tap all relevant (i.e., operating) ingress ports 20 and may emulate a subset of functions performed by network element 10. The subset of functions emulated may be those necessary to infer the resulting packet arrival processes at each egress queue of each egress port of network element 10. To this end, external monitoring apparatus 90 may replicate packet classification/policing with emulated classification and policing processors 92 and may replicate switching with emulated switch fabric 94. Although egress queues 60 and egress ports 30 are depicted in a one to one relationship (as depicted in FIGS. 1A and 1B) they may also be configured in a many to one relationship (as depicted in FIGS. 2A and 2B). Appropriate modifications may be made to monitoring modules 80 to emulate a scheduling policy implemented by schedulers 70. Examples of such modifications are explained below with reference to FIG. 4.

Figure 4:
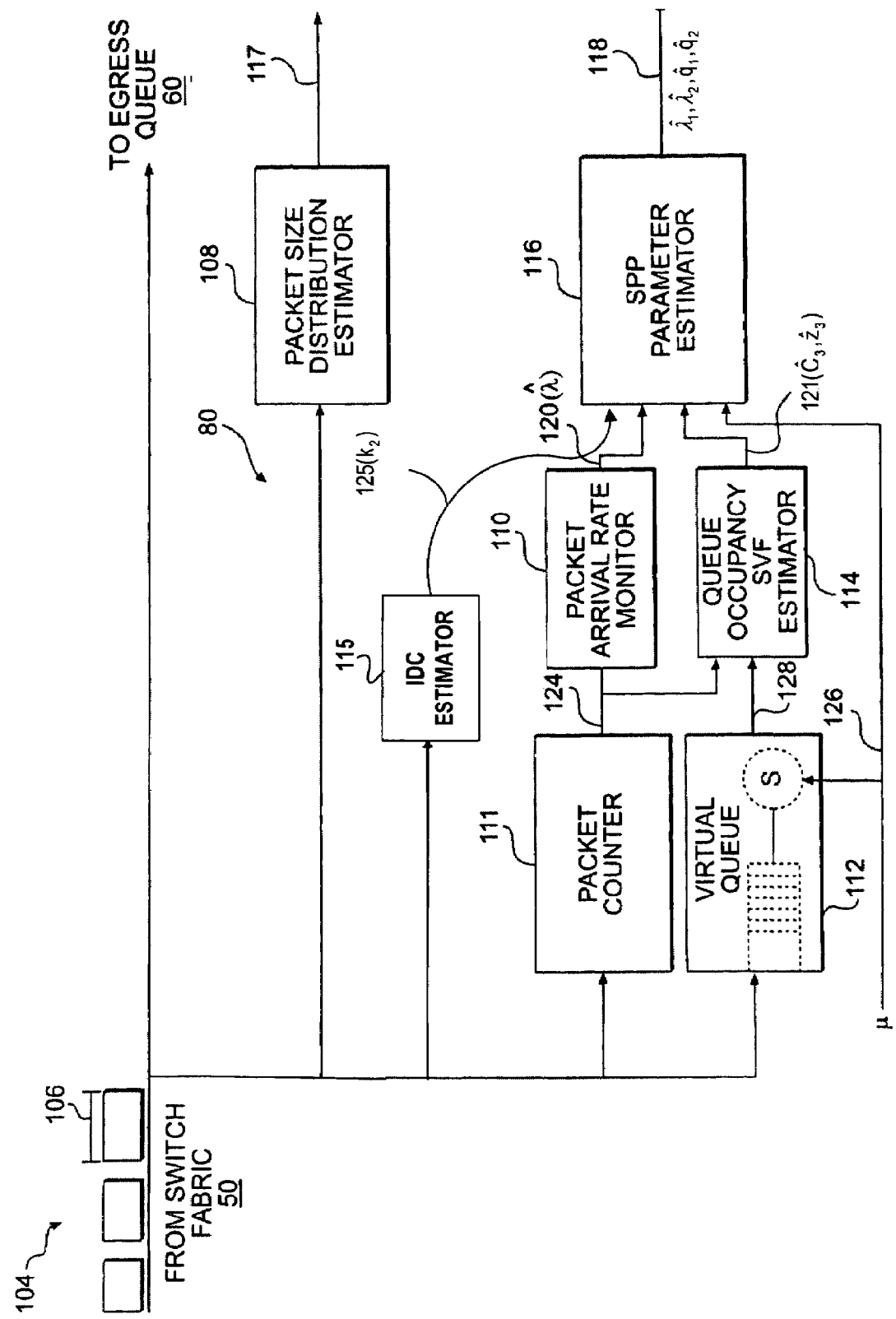
FIG. 4 is a functional block diagram of a monitoring module.

FIG. 4 is a functional block diagram of monitoring module 80 receiving arriving packets 104 of unspecified random packet lengths 106 from switch fabric 50. A probability distribution of packet lengths 106 and a random packet arrival process associated with arriving packets 104 are unknown. Monitoring module 80 may use a switched Poisson process (SPP) as a traffic model to represent the packet arrival process associated with arriving packets 104. Using an SPP as a model, monitoring module 80 may estimate model parameters. The model parameters may be used to predict how changes made to a buffer size of corresponding egress queue 60 or a speed (i.e., bit rate) of corresponding egress port 30 will impact performance. Although monitoring module 80 is shown internal to network element 10, monitoring module 80 may also be configured external to network element 10, as shown in FIG. 3.

Monitoring module 80 may include a packet size distribution estimator 108, a packet arrival rate monitor 110, a packet counter 111, a virtual queue 112, a queue occupancy survivor function (SVF) estimator 114, an Index of Dispersion of Counts (IDC) estimator 115, and an SPP parameter estimator 116.

Monitoring module 80 may receive arriving packets 104 and may output a packet size distribution 117 (e.g. a histogram) and estimated SPP parameters 118 of a traffic model representing a packet arrival process associated with arriving packets 104. Based on packet size distribution 117 and estimated SPP parameters 118, characteristics such as link capacity and buffer capacity of a particular egress port and egress queue, respectively, in network element 10, may be optimized to meet performance objectives using analytical techniques as is well known. Performance objectives may include bounds on latency or loss of packets. Harry Heffes and David Lucantoni disclose analytical techniques for optimizing characteristics such as link capacity and buffer capacity in "A Markov Modulated Characterization of Packetized Voice and Data Traffic and Related Statistical Multiplexer Performance," IEEE Journal on Selected Areas in Communications, September 1986 ("Heffes and Lucantoni"), incorporated herein by reference.

Packet size distribution estimator 108 may estimate packet size distribution 117 by tallying observed packet sizes of arriving packets 104 into bins denoting the number of occurrences of packets having a given size or size range (representing a packet size histogram). Packet size distribution estimator 108 may also normalize the bin tallies by the total number of packets observed to obtain relative frequencies of various different ranges (or bins) of observed packet sizes (representing a normalized packet size histogram).

SPP parameter estimator 116 may generate estimated SPP parameters 118 based on empirical measurements provided by packet arrival rate monitor 110, IDC estimator 115, virtual queue 112, and queue occupancy SVF estimator 114. Empirical measurements may include estimated average arrival rate 120 ($\hat{\lambda}$) of the packet arrival process associated with arriving packets 104, IDC[mT], which may be an estimate of the function IDC(t), and a set of SVF parameters 121 of an empirical SVF 122 associated with virtual queue 112. For example, packet arrival rate monitor 110 may monitor packets 104 arriving at egress queues 60 and may receive a running packet tally 124 from packet counter 111 to estimate an average arrival rate 120 ($\hat{\lambda}$) over a predetermined observation period. Packet arrival rate monitor 110 may provide the estimated average arrival rate 120 ($\hat{\lambda}$) to SPP parameter estimator 116.

IDC estimator 115 may provide an IDC parameter 125 ($k_2$) derived from IDC[mT], which is an empirical estimate of IDC(t), to SPP parameter estimator 116. IDC(t) is a function of time (represented by the variable, t) with IDC(t) defined as the Variance to Mean Ratio of the number of packets that arrive in time duration t. With t fixed, the number of packet arrivals in time t, denoted as N(t), is a random variable and thus IDC(t)=Variance[N(t)]/Mean[N(t)] is a moment statistic. In practice, IDC(t) may be approximated in quantized form by IDC[mT] where t=mT, m=1, 2, ... M (an integer), and T is a fixed time interval. In this context N[mT] is the random variable of packet arrival counts in non-overlapping intervals of duration mT. Note that since T is of fixed duration, IDC[mT] is effectively a function of index m.

IDC estimator 115 may perform a sample-based estimation procedure to estimate IDC(t). For example, IDC estimator 115 first may divide a total observation period into non-overlapping timeslots of duration T (with T much smaller than the observation period). The observation period may be the period over which the SPP parameters are to be estimated (e.g. 15 mins or 30 mins or 1 hour, etc. . . . ). Denoting the sample mean and sample variance of the number of packet arrivals observed in the timeslots of duration T as E[N(T)] and Var[N(T)], respectively, the IDC estimate at time t=T is IDC[T]=Var[N(T)]/E[N(T)]. Now consider the total observation period divided into non-overlapping timeslots of duration 2T. Then, IDC[2T]=Var[N(2T)]/E[N(2T)] may be computed in a similar fashion. The process of computing IDC[mT] may be performed analogously for each slicing of the total observation period into timeslots of duration mT for m=1, 2, ... M (an integer). Note that M may be selected as large as possible but bounded such that MT may still be much smaller than the total observation period (to provide enough samples to maintain statistical accuracy in computing, IDC[MT] (the IDC at it's largest time value MT). For example, for a given value of T, selecting M such that MT<90, ensures that at least 100 samples are used in the computation of the sample mean and sample variance of N(T) used to estimate IDC(MT). A practical implementation of IDC estimator 115 may compute the data points corresponding to each index m in a single pass of packet arrival data during the observation period. That is, the sample mean and sample variance of N(mT) for each time index m (m=1, 2, ..., M), may be computed in parallel as the packets arrive in real time. Heffes and Lucantoni provide definitions and further explication of IDC functions and statistics.

In addition, queue occupancy SVF estimator 114 may provide SVF parameters 121 to SPP parameter estimator 116. Queue occupancy SVF estimator 114 may determine SVF parameters 121 based on running packet tally 124 and a virtual queue histogram 128 generated by virtual queue 112.

Figure 5:
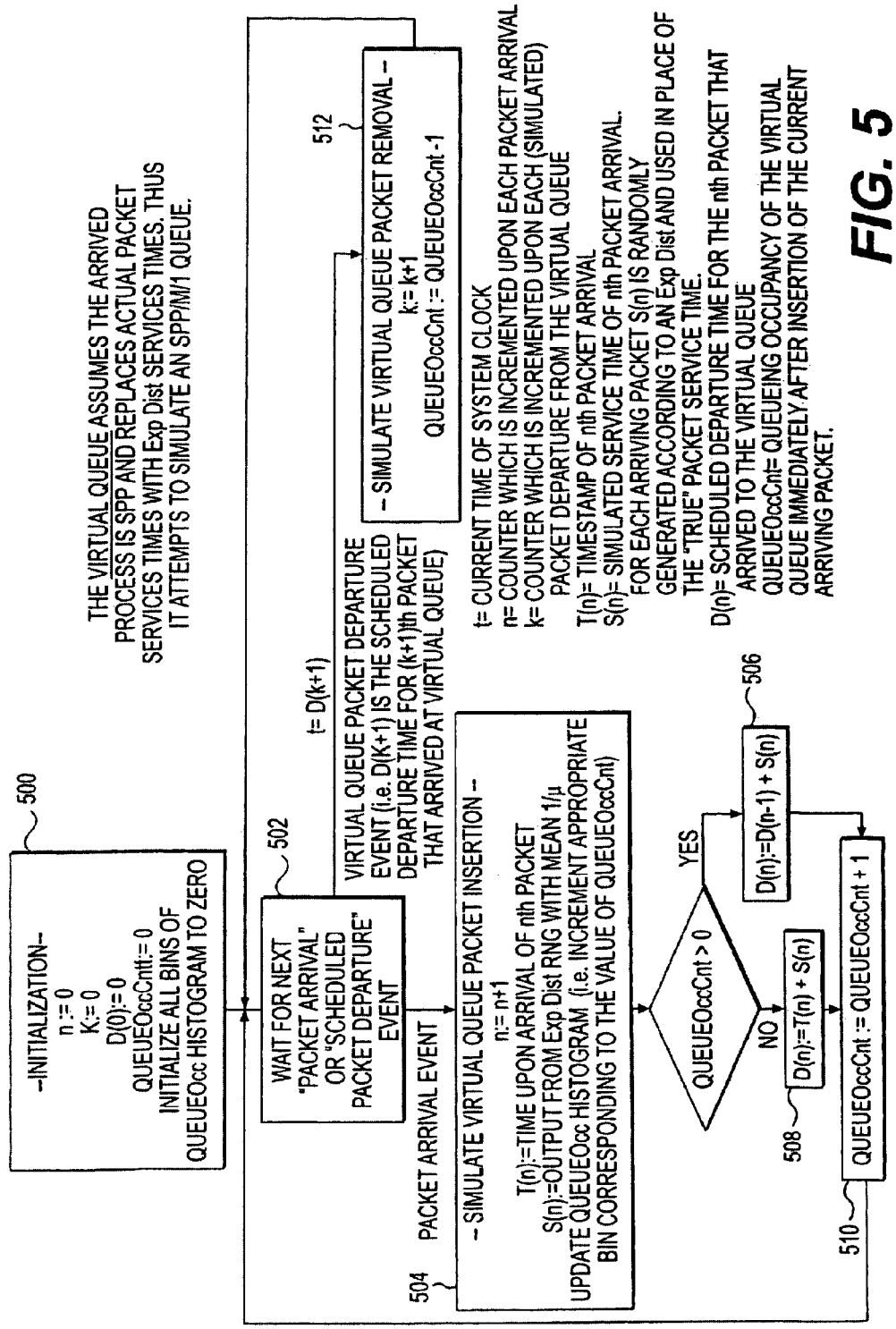
FIG. 5 is a flow diagram depicting a method that may be implemented by a virtual queue in a monitoring module.

FIG. 5 is a flow diagram depicting an algorithm that may be implemented by virtual queue 112 to emulate an SPP/M/1 queue and to thereby generate virtual queue histogram 128 for queue occupancy survivor function (SVF) estimator 114. An SPP/M/1 queue is a purely Markovian Quasi-Birth-Death (QBD) queue. For an SPP/M/1 queue, the arrival process is an SPP and the service process is an independent and exponentially distributed service time for each arriving packet. By convention an exponentially distributed service process is denoted by M (for Markov process). In furtherance of emulating an SPP/M/1 queue, virtual queue 112 may emulate, with hardware or software, a buffer of sufficient size such that no arriving packets 104 are dropped as a result of buffer overflow (i.e., virtual queue 112 emulates a buffer of infinite size).

As shown in FIG. 5, virtual queue 112 may initialize variables (stage 500) including, for example, a packet arrival tally variable, n, for tallying each packet arrival; a packet departure tally variable, k, for tallying each simulated packet departure; a "departure time" array of variables, D(n), for storing a scheduled departure time for each packet queued in virtual queue 112; a queue occupancy count variable, QueueOccCnt, for storing a number of packets (i.e., queue occupancy) in virtual queue 112 observed immediately after a packet arrival; and queue occupancy histogram 128, QueueOcc, for storing a histogram of observed queue occupancy values. Virtual queue 112 may then enter a waiting state in which it waits for a packet arrival or scheduled packet departure event (stage 502).

A service rate of the service process implemented in virtual queue 112 may be specified, e.g., by a user, as service rate 126 ($\mu$). For example, virtual queue 112 may substitute exponentially distributed service times in place of actual service times. For any given port speed, service times may be proportional to sizes of arriving packets, and thus substituting service times may be equivalent to substituting packet sizes in place of actual packet sizes (at the same port speed). Thus, when a packet arrival occurs (i.e., a packet from switch fabric 50, as depicted by packets 104, arrives), virtual queue may simulate a packet insertion (stage 504) by generating a simulated service time, S(n), with a random number generator having an exponentially distributed probability distribution with mean $1/\mu$. Virtual queue 112 may also increment the packet arrival tally, n, measure an arrival time, T(n), and update the QueueOcc histogram by incrementing a bin corresponding to the current value of QueueOccCnt (stage 504). Virtual queue 112 may then assign the arrived packet a scheduled departure time. If the virtual queue is not empty (i.e., QueueOccCnt>0), the assigned scheduled departure time may be the sum of the scheduled departure time of the next packet scheduled for service and the arriving packet's simulated service time, S(n) (stage 506). If, on the other hand, the virtual queue is empty (i.e., QueueOccCnt=0), the assigned scheduled departure time may be the sum of the packet's arrival time, T(n), and the arriving packet's simulated service time, S(n) (stage 508). Finally, virtual queue 112 may increment the QueueuOccCnt variable (stage 510), and return to the waiting state (stage 502).

When a packet departure occurs during the waiting state, virtual queue 112 may simulate the packet departure by incrementing the packet departure tally, k, and decrementing the QueueuOccCnt variable (stage 512). Thus, instead of actually transmitting bits of arriving packets 104 as egress queues 60 would, virtual queue 112 may simply decrement the queue occupancy count (QueueOccCnt) at a packet's scheduled departure time (i.e., derived from specified service rate 126 (μ)). A packet departure may occur at the scheduled departure time D(k+1) for the (k+1)th packet that arrived at virtual queue 112. Virtual queue 112 then may return to the waiting state (stage 502).

Virtual queue 112 may implement the algorithm depicted in FIG. 5 for a predetermined period of time sufficient to generate a statistically significant virtual queue histogram 128 for queue occupancy SVF estimator 114. Virtual queue histogram 128 may vary over time due to the random nature of the packet arrival process associated with arriving packets 104 and random packet lengths 106. To optimize the spread of queue occupancy values across the bin range in the virtual queue histogram 128, service rate 126 (μ) may be chosen so that utilization of virtual queue 112 is kept between approximately 40% and 80%. Moreover, if egress queues 60 and schedulers 70 are arranged as shown in FIGS. 2A and 2B, a service rate of scheduler 70-1 may be divided between egress queue 60-1$a$ and 60-1$b$ according to a specified scheduling policy. For example, if egress queues 60-1$a$ and 60-1$b$ are served by scheduler 70-1 according to a Weighted Fair Queuing (WFQ) scheduling scheme, service rates 126 (μ) for corresponding monitoring modules 80-1$a$ and 80-1$b$ may be chosen to emulate the relative proportion of the egress port speed assigned to the CoS served by egress queues 60-1$a$ and 60-1$b$, respectively. Service rates 126 (μ) for monitoring modules 80-2$a$ and 80-2$b$ (not shown), and so on through monitoring modules 80-N$a$ and 80-N$b$, may be chosen in a similar fashion.

Figure 6:
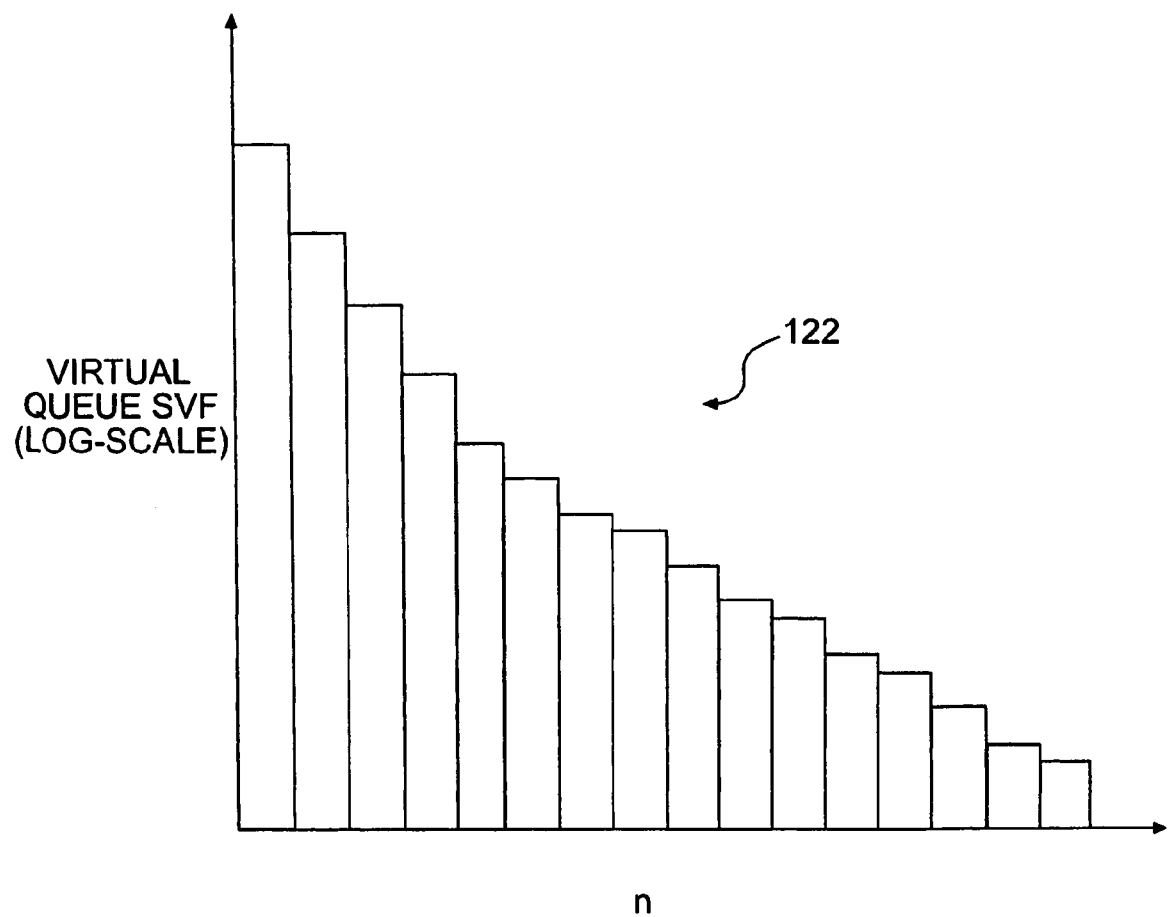
FIG. 6 is a log-scale graph of an exemplary survivor function generated by a survivor function generator of FIG. 4.

FIG. 6 is a log-scale graph of an exemplary Survivor Function (SVF) 122 generated by queue occupancy SVF estimator 114. Empirical SVF 122 is also known as a complementary cumulative distribution function and may be expressed as P(X>n) where X is a random variable representing system occupancy of virtual queue 112 and n is an integer greater than or equal to zero. P(X>n) represents the probability that system occupancy (random variable X) is greater than n. Empirical SVF 122 may be the empirical realization of P(X>n) and derived from a histogram of the system occupancy generated by virtual queue 112 in conjunction with packet tally 124 received from packet counter 111. For example, queue occupancy SVF estimator 114 may first tally a frequency (i.e. number of occurrences) of each occupancy value, n, observed in virtual queue 112 and then divide each frequency by packet tally 124 to obtain a normalized histogram 128 of the SPP/M/1 system occupancy, otherwise know as an empirical probability distribution function (PDF). Using cumulative sums of the bins which make up the empirical PDF 128, an empirical cumulative distribution function (CDF) may be derived from empirical PDF 128. Empirical SVF 122 may then be derived as one minus the empirical CDF.

As explained above, monitoring module 80 may substitute exponentially distributed service times with user specified mean service rate (μ), in place of the actual service times associated with arriving packets 104 in virtual queue 112. Therefore, given the SPP arrival process assumption, by substituting the exponentially distributed service times, virtual queue 112 may emulate an SPP/M/1 queue. The theoretical SVF of the system occupancy for an SPP/M/1 queue has the form:

$$P(X>n) = \rho \cdot \delta[n] + (C_3 z_3^{-n} + C_4 z_4^{-n}) u[n-1] \qquad \text{Equation (1)}$$

As previously stated, P(X>n) denotes the probability the system occupancy (i.e. number of packets in the system) is greater than n. In equation (1), $\rho = \lambda/\mu$ is the utilization factor of an SPP/M/1 queue with service rate μ driven by an SPP arrival process having mean arrival λ, δ[n] is the Dirac delta function, and u[n] is the unit step function.

Figure 7:
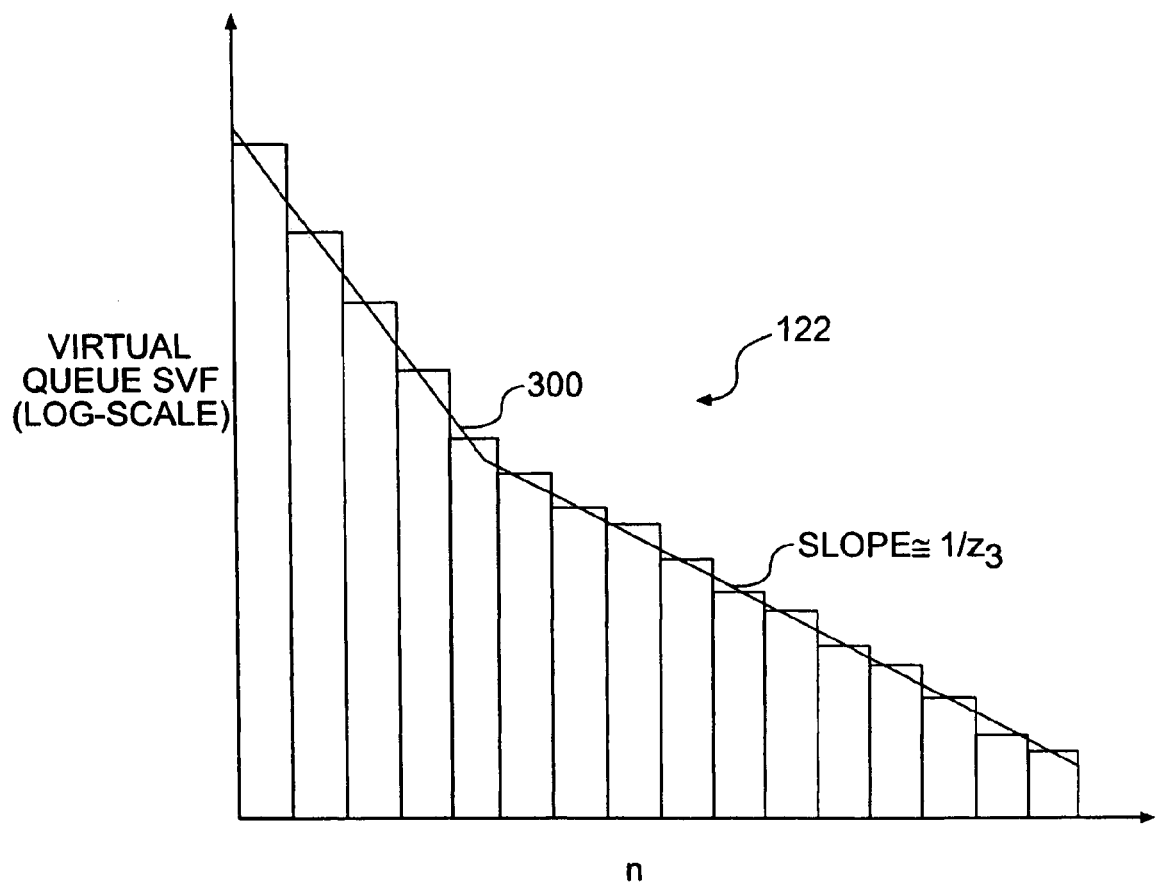
FIG. 7 is a log-scale graph of a curve that approximates the exemplary survivor function of FIG. 6.

FIG. 7 is a log-scale graph that illustrates a curve 300 (i.e. solid lined curve) superimposed on the empirical SVF 122 (as typically might be derived within queue occupancy SVF estimator 114 based on the empirical PDF 128 passed to SVF estimator 114 by virtual queue 112). The empirical SVF 122 is depicted by the bars in FIG. 7. The curve 300 is hereto referred to as an SVF estimation curve. SVF estimation curve 300 has the form of equation (1). Equation (1) includes two geometric terms on the far right hand side: $C_3 z_3^{-n}$ and $C_4 z_4^{-n}$. Without loss of generality, it is assumed that $z_3 < z_4$ (implying $1/z_3 > 1/z_4$, and thus $z_4^{-n}$ decays more rapidly than $z_3^{-n}$). Thus, for large n, it is clear that $P(X>n) \approx C_3 z_3^{-n}$ and thus the slope, $1/z_3$, of the SPP SVF in log-scale at large n may be referred to as the asymptotic decay rate, and coefficient, $C_3$, referred to as the asymptotic coefficient.

The output of virtual queue 112 may be empirical PDF 128 (i.e. a normalized histogram) of the SPP/M/1 system occupancy distribution. Empirical PDF 128 may be in turn passed as input to SVF estimator 114 which may internally generate empirical SVF 122 from which it computes an SVF estimation curve 300. The tail region (i.e. region where n is large) of that curve may then be used to estimate parameters $\hat{C}_3$ and $\hat{z}_3$. Note that these parameters may be easily estimated using a simole linear regression fit to the tail region of empirical SVF 122.

The theoretical IDC for an SPP has the form:

$$IDC[mT] = 1 + \frac{2k_1}{\lambda} - \frac{2k_1}{\lambda k_2 mT}(1 - e^{-k_2 mT}) \qquad \text{Equation (2)}$$

where $$k_1 = \frac{(\lambda_1 - \lambda_2)^2 q_1 q_2}{(q_1 + q_2)^3}, \quad k_2 = q_1 + q_2$$

and $\lambda = \dfrac{\lambda_1 q_2 + \lambda_2 q_1}{k_2}$ is the mean arrival of the SPP.

Figure 8:
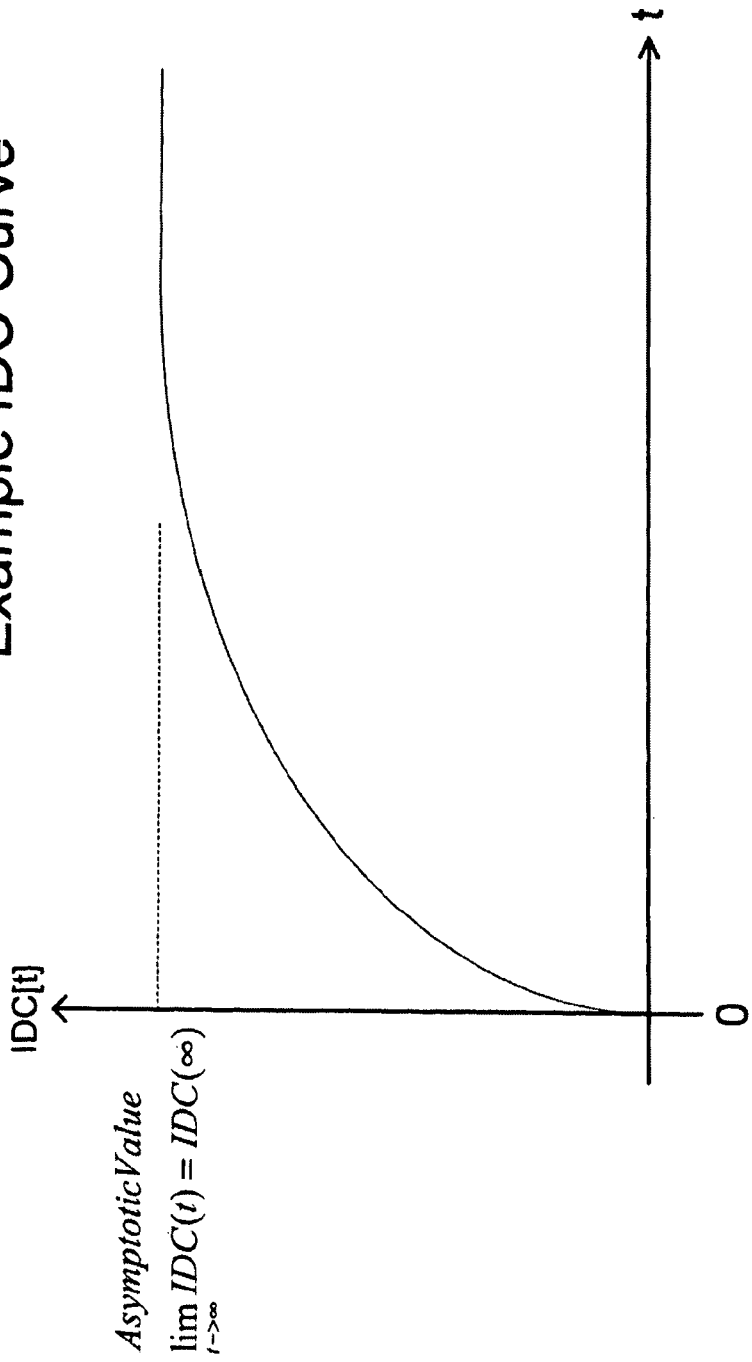
FIG. 8 is an exemplary graph of an Index of Dispersion of Counts (IDC) function.

FIG. 8 is an exemplary graph of equation (2). The goal of IDC estimator 115 may be to compute and output IDC parameter ($\hat{k}_2$) 125. IDC estimator 115 may calculate IDC parameter 125 ($\hat{k}_2$) by fitting equation (2) to the empirical IDC[mT] measured from the packet arrival process 104 entering and monitoring model 80 (which is assumed to be an SPP). This may be achieved as follows:

The IDC of an SPP approaches a limiting value asymptotically, as depicted in FIG. 8. This limiting (or asymptotic) value may be determined from equation (2) to be:

$$IDC[\infty] = 1 + \frac{2k_1}{\lambda}$$

Since IDC[∞] may be estimated from the empirical IDC function of a packet arrival process (and should be visually apparent as depicted in FIG. 8), $$\hat{k}_1 = \frac{\hat{\lambda}(IDC[\infty] - 1)}{2}$$

where 120 ($\hat{\lambda}$), the output of packet arrival rate monitor 110, is substituted for λ in Equation (2). Once $\hat{k}_1$ is known, then $\hat{k}_2$ is the only remaining unknown in equation (2). Therefore one may perform a search for the value $\hat{k}_2$ that may provide the best fit of equation (2) to the empirical IDC ("best fit" defined in some sense such as a cumulative error minimization or an exact fit at a single data point, etc. . . .). The resulting value $\hat{k}_2$ may then be provided as the output of IDC estimator 115.

Note that IDC estimator 115 may fit the SPP IDC nicely to packet arrival processes that may exhibit the asymptotic characteristic in their empirical IDC as depicted in FIG. 8. Such traffic processes are called Short Range Dependent (SRD) processes. For that reason, the SPP, being an SRD process itself, may be a plausible model for SRD traffic. However, for traffic that may not exhibit this characteristic it may be difficult to fit equation (2), the SPP IDC equation, to an empirical IDC that may not have the form depicted in FIG. 8. For example some packet arrival processes may have an empirical IDC that appears to gradually and continually increase over a large time range, making it difficult to detect a empirical value for IDC[∞]. This issue may arise for Long Range Dependent (LRD) (or Self-Similar) traffic. LRD traffic may have the property of a continually increasing IDC with no apparent limiting value over a large time range. In practice, when LRD traffic is encountered, it may be more appropriate to assume a d-SPP model as described in paragraphs [051] and apply a d-SPP fitting procedure. Alternatively, in cases where it is sufficient to model the behavior of an LRD process over a very limited time range, one may choose to use an SPP for that purpose, and equation (2) may be fit to the empirical IDC over that limited time range (i.e. in the region of small values of m). In this case, some fictitious value for IDC[∞] may be assumed within the time range of interest.

At this point, there may be 120 ($\hat{\lambda}$) from packet arrival rate monitor 110, 121 ($\hat{C}_3$ and $\hat{z}_3$) from queue occupancy SVF estimator 114, and 125 ($\hat{k}_2$) from IDC estimator 115. The goal of SPP parameter estimator 116 may be to take these four parameters ($\hat{\lambda}$, $\hat{C}_3$, $\hat{z}_3$, $\hat{k}_2$) in addition to the user specified service rate μ (for virtual queue 112) as inputs, and from them compute the SPP model parameters 118 ($\hat{\lambda}_1$, $\hat{\lambda}_2$, $\hat{q}_1$, $\hat{q}_2$). To achieve this, SPP parameter estimator 116 may proceed as follows. It first may define $C_3^*(z_4)$. That is, it may define $C_3^*$ as a function of $z_4$ as follows $$C_3^*(z_4) = \frac{(\hat{z}_3)^2 z_1 z_4 N(\hat{z}_3)}{\mu^2 (\hat{z}_3 - z_1)(\hat{z}_3 - z_3)(1 - \hat{z}_3)} \quad \text{Equation (3)}$$

where $$z_1 = \frac{1}{1+\theta}, \quad \theta = \frac{\hat{z}_3 z_4}{\hat{k}_2(\mu - \hat{\lambda})(1 - \hat{z}_3)(1 - z_4)} \quad \text{Equation (4)}$$

$$N(\hat{z}_3) = \mu(\hat{z}_3)^2 d - \hat{z}_3(\mu d + \mu P_0 \hat{k}_2 + P_0 \mu^2) + P_0 \mu^2 \quad \text{Equation (5)}$$

-continued $$d = \frac{z_1(\mu P_0 \hat{k}_2 - P_0 \mu^2)}{\mu(z_1^2 - z_1)} \quad \text{Equation (6)}$$

$$P_0 = \left(1 - \frac{\hat{\lambda}}{\mu}\right) \quad \text{Equation (7)}$$

That is, for each given value $z_4$, it may first computes $z_1$ using Equation (4). It may next determine d using Equations (6) and (7). It may then determine $N(\hat{z}_3)$ using Equation (5) and finally compute $C_3^*(z_4)$ by applying Equation (3).

By continually using this process, SPP parameter estimator 116 may perform a search for the value of $z_4$ that solves $C_3^*(\hat{z}_4) = \hat{C}_3$. Note that (as specified in paragraph [040]) $z_4$ may be constrained to be greater than $\hat{z}_3$. An initial value for $z_4$ that has served will in practice is $z_4^{INIT} = 2\hat{z}_3$ though any value greater than $\hat{z}_3$ may be used as a starting value for $z_4$. Once the value $\hat{z}_4$ that satisfies $C_3^*(\hat{z}_4) = \hat{C}_3$, has been determined, then $\hat{z}_1$ may be determined by substituting $\hat{z}_4$ for $z_4$ in Equation (4). SPP parameter estimator 116 may then compute the SPP parameters 118 by applying the following:

$$\varsigma = \mu\left[\frac{1}{\hat{z}_1} + \frac{1}{\hat{z}_3} + \frac{1}{\hat{z}_4} - (\mu + \hat{k}_2)\right] \quad \text{Equation (8)}$$

$$\hat{\lambda}_1 = \frac{\varsigma + \sqrt{\varsigma^2 - \frac{4\mu^2}{\hat{z}_1 \hat{z}_3 \hat{z}_4}}}{2} \quad \text{Equation (9)}$$

$$\hat{\lambda}_2 = \frac{\varsigma - \sqrt{\varsigma^2 - \frac{4\mu^2}{\hat{z}_1 \hat{z}_3 \hat{z}_4}}}{2} \quad \text{Equation (10)}$$

$$\hat{q}_1 = \frac{\hat{k}_2(\hat{\lambda} - \hat{\lambda}_1)}{\hat{\lambda}_2 - \hat{\lambda}_1} \quad \text{Equation (11)}$$

$$\hat{q}_2 = \hat{k}_2 - \hat{q}_1 \quad \text{Equation (12)}$$

Estimated SPP parameters 118 ($\hat{\lambda}_1$, $\hat{\lambda}_2$, $\hat{q}_1$, $\hat{q}_2$) and measured packet size distribution 117 may be used to predict the performance metrics of a network in which network element 10 operates using SPP/$G_i$/1 queuing analysis techniques as is well known, such as those disclosed by Heffes and Lucantoni. The "$G_i$" in the SPP/Gi/1 notation stands for a "general" independent and identically distributed service time distribution, which monitoring modules 80 may be equipped to derive based on packet size distribution 117. Monitoring modules 80 may be further equipped to predict the performance impact of a change in output link capacity or buffer capacity in egress queues 60 of network element 10 based on estimated SPP parameters ($\hat{\lambda}_1$, $\hat{\lambda}_2$, $\hat{q}_1$, $\hat{q}_2$) and packet size distribution 117. Such analyses could also be performed offline by a software application using the parameters provided by monitoring modules 80. Each of monitoring modules 80 may also be equipped to periodically update their respective estimated SPP parameters 118 and packet size histograms 117 to external host systems running offline software (or internally) so that minimum output capacity and/or buffer size required to meet particular performance objectives for egress queues 60 may be computed as a function of time of day. Performance objectives may include a desired bound on maximum service delay (i.e., latency) or a desired bound on maximum loss of packets at one or more egress queues 60. In addition, an operator may make adjustments to egress queues 60 and egress ports 30 in network element 10 to achieve the efficient use of link buffering and/or bandwidth resources based on estimated SPP parameters 118 ($\hat{\lambda}_1$, $\hat{\lambda}_2$, $\hat{q}_1$, $\hat{q}_2$), packet size distribution 117, and performance objectives. For example, estimated SPP parameters 118 ($\lambda_1$, $\lambda_2$, $q_1$, and $q_2$) and packet size distribution 117 may prompt changes to memory capacity requirements for one or more egress queues 60 or changes to link capacity requirements for one or more egress ports 30 to minimize the memory and/or bandwidth resources used while still maintaining a given set of performance objectives.

In general, monitoring modules 80 may assume packet arrival process 104 can be modeled by a switched Poisson process model and estimate SPP parameters 118 ($\hat{\lambda}_1$, $\hat{\lambda}_2$, $\hat{q}_1$, $\hat{q}_2$) of packet arrival processes associated with arriving packets 104 arriving at network element 10. SPP parameter estimator 116 may estimate SPP parameters 118 ($\hat{\lambda}_1$, $\hat{\lambda}_2$, $\hat{q}_1$, $\hat{q}_2$) based on empirical measurements provided by packet arrival rate monitor 110, IDC estimator 115, virtual queue 112, and queue occupancy SVF estimator 114. Based on estimated SPP parameters 118 ($\hat{\lambda}_1$, $\hat{\lambda}_2$, $\hat{q}_1$, $\hat{q}_2$) and packet size distribution 117, an impact of changing buffer capacity characteristics of egress queues 60 and/or link capacity characteristics of egress ports 30 in network element 10 may be predicted and changes may be made to maintain service performance requirements for flow of traffic in a network while achieving better cost efficiency.

Modifications and variations are possible in light of the above teachings or may be acquired from practicing of the invention. Additional modifications and variations may be, for example, the described implementation includes hardware but the present invention may be implemented as a combination of hardware and software or in software alone. All or part of the systems and methods consistent with the present invention may be stored on or read from computer-readable media, such as secondary storage devices, like hard disks, floppy disks, and CD-ROM; a carrier wave received from a network such as the Internet; or other forms of ROM or RAM.

Another modification may include use of a superposition of multiple statistically independent SPPs as a traffic model instead of a single SPP to represent packet arrival processes associated with egress queues 60. A superposition of some number, d, of Switched Poisson Processes (SPPs), referred to as a d-SPP, may be made to approximate Long Range Dependent (LRD) traffic behavior. As explained above, LRD (or Self-Similar) traffic may be characterized by an IDC having continually increasing IDC (unlike the bounded IDC of an SPP as depicted in FIG. 8). The IDC of an LRD process may be known to have the form:

$$IDC[m] \approx c \cdot m^{2H-1}$$

where parameter H is called the Hurst parameter with range ½<H<1, and c being some constant. In log-scale, the IDC may have the form of an increasing straight line with slope 2H−1. Even though the d-SPP may actually be d-SPP itself (i.e. its IDC may reach an asymptotic bound at some point), it may be parameterized to mimic the form of an LRD IDC over several timescales. The "timescale" of an SPP with parameters $\lambda_1$, $\lambda_2$, $q_1$, and $q_2$ may be commonly defined as the quantity $1/k_2 = 1/(q_1+q_2)$. When using a d-SPP to model an LRD process, each component SPP may serve the purpose of capturing a particular timescale range of the complete IDC (of the packet arrival process); thus allowing for modeling traffic variability over a range of timescales. The i-th SPP in a d-SPP model may alternate between two rates, $\lambda_{1i}$ and $\lambda_{1i}$, in accordance with transition rates, $q_{1i}$ and $q_{2i}$, as explained above in reference to an SPP. Thus, due to the superposition property of SPPs, 4d total parameters (i.e. 4 parameters for each SPP) may be estimated to completely characterize a d-SPP model.

d-SPP may provide a superior model fit for LRD traffic when compared to using a single SPP but may involve more complexity in estimating its parameters. As in the case of an SPP, a d-SPP model fit procedure may use a combination of the packet arrival process mean rate, an IDC estimate, and a virtual queue to estimate the parameters for each constituent SPPs. The parameterized SPP super-position may in turn be used for link sizing, traffic engineering, and measurement based admission control. Other applications in traffic management and control may be possible.

Much like the case of using a single SPP, a d-SPP fitting procedure may use three empirical measures: the packet arrival mean rate, the empirical IDC and empirical SVF observed at a pre-determined service rate. Also, as in the case of a single SPP, exponentially distributed service times may be imposed.

Before the d-SPP fitting procedure may be performed, the timescale range over which the empirical IDC will be matched may be selected. This may be necessary because even a d-SPP may ultimately be SRD and only mimic the IDC of an LRD process over a finite range. For example, the lower and upper time index boundaries of the timescale of interest may be denoted as $m_1$ and $m_d$, respectively.

The first step of the d-SPP fitting procedure may be to fit the d-SPP IDC equation $$IDC[mT] = \sum_{i=1}^{d} 1 + \frac{2k_{1i}}{\lambda} - \frac{2k_{2i}}{\lambda k_{2i} mT}(1 - e^{-k_{2i}mT}) \quad \text{Equation (13)}$$

to that of an LRD process over the range bounded by $m_1$ and $m_d$. In equation (13), $\lambda$ may denote the overall mean rate of the d-SPP arrival process (i.e. the sum of the mean rates of the individual SPP that may constitute the d-SPP). The IDC of an LRD process may have the form $$c \cdot m^{2H-1} \quad \text{Equation (14)}$$

where H(½<H<1), may be the Hurst parameter of the LRD. Thus, it may be necessary to minimize $$\min_{k_{1i}, k_{2i}} \sum_{m_1 \leq m \leq m_d} |e[m]|, \forall i \in [1, d] \quad \text{Equation (15)}$$

where $e[m] = c \cdot m^{2H-1} - IDC[mT] =$ $$\sum_{i=1}^{d} 1 + \frac{2k_{1i}}{\lambda} - \frac{2k_{2i}}{\lambda k_{2i} mT}(1 - e^{-k_{2i}mT})$$

This first step in the d-SPP fitting process may be performed by an IDC estimator (such as 115 as illustrated in FIG. 4 for the SPP case). The output of this step may result in the parameters $k_{1i}$, and $k_{2i}$, for i=1,2, . . . , d. One simple methodology for achieving this may be to use a simplified form of the well known Prony method. Since it may be necessary to apply a super-position of SPPs, each operating on a different timescale, $1/k_{2i}$, the ratio of the timescales of the constituent SPPs may be defined to be a constant value a where a may be sufficiently large to ensure each SPP may fall in a different time scale (i.e. each SPP timescale may be significantly distant from that of any other SPP in the d-SPP). $a \geq 10$ may be preferably selected. Thus, beginning from $k_{2l}$, (corresponding to the smallest timescale $1/k_{2l}$), each $k_{2i}$ may be specified as follows:

$$k_{2i} = k_{2l} a^{-(i-1)}, i \in [1, d] \quad \text{Equation (16)}$$

To provide a fit of the d-SPP IDC to that of an LRD process at points $m_1, m_2, \ldots, m_d$ with each of these d points positioned on a different timescale, a constant parameter h may be defined such that:

$$h = k_{2i} m_i = \text{const } i \in [1, d] \quad \text{Equation (17)}$$

where $h \approx 1$.

Also, d auxiliary functions may be defined as:

$$w(t) = \sum_{1}^{d} k_{1i}(1 - r_i(t)) \quad \text{Equation (18)}$$

where $$r_i(t) \equiv \frac{(1 - e^{-k_{2i}t})}{k_{2i}t} \quad \text{Equation (19)}$$

and $i \in [1, d]$. Next, a matrix $A=[A_{ij}]$ may be introduced with $A_{ij}$ elements defined as $$A_{ij} = (1 - r_j[m_i T]) i, j \in [1, d] \quad \text{Equation (20)}$$

$\overline{k_1} = \{k_{11}, k_{12}, \ldots, k_{1d}\}$ may denote the vector of IDC $k_1$ parameters (each element $k_{1i}$ representing the $k_1$ parameter in equation (13) for the i-th SPP in the d-SPP), and thus $\overline{k_1}$ may be solved via the linear system of equations $$A\overline{k_1} = \overline{w}$$

where $\overline{w} = \{w[m_1 T], w[m_2 T], \ldots, w[m_d T]\} \quad \text{Equation (21)}$ Due to Equation (16), the analogous vector of IDC $k_2$ parameters (i.e. $\overline{k_2}$) are already established as a function of $k_{21}$. Thus, the combination of equations (16) and (21) may effectively provide a means for IDC matching as a function of the single parameter $k_{21}$. That is for any value of $k_{21}$, a corresponding $\overline{k_1}$, and $\overline{k_2}$ may be computed by application of equations (16) and (21). A numerical error minimization scheme may thus be used to search for the best fit to the empirical IDC as a function of $k_{21}$. For example, the absolute error minimization across the timescale range of interest as the objective function for such a fit may be used. Using a methodology such as this or an alternatively methodology for minimizing equation (15), the IDC estimator may provide estimates of the vectors $\overline{k_1}$ and $\overline{k_2}$ as outputs. These $\overline{k_1}^*$ and $\overline{k_2}^*$ may be denoted. For example, unlike the single SPP case (where only parameter $\hat{k}_2$ is used), in the d-SPP fitting procedure, both the estimated IDC vectors $\overline{k_1}^*$ and $\overline{k_2}^*$ may be used to compute the parameters of d-SPP. Consequently, the IDC estimator for the d-SPP fitting embodiment may output both vectors $\overline{k_1}^*$ and $\overline{k_2}^*$ After completion of the IDC estimation step, the vectors $\overline{k_1}^*$ and $\overline{k_2}^*$ may be made available. Simultaneous to the IDC estimation process, the mean arrival rate of the packet arrival process may be monitored by a packet arrival rate monitor (as depicted in FIG. 4 for the single SPP case). The mean rate measured by the packet arrival rate monitor may be denoted as $\hat{\lambda}$.

An Interrupted Poisson Process (IPP) may simply be an SPP with one of its rates ($\lambda_1$ or $\lambda_2$) being zero. It is known that any d-SPP may be constructed as a superposition of d IPPs and a pure Poisson process, and hence distinguished by 3d+1 independent parameters (i.e. a d-SPP has 3d+1 degrees of freedom). Given the 2d+1 parameters provided by $\overline{k_1}^*$, $\overline{k_2}^*$, and $\hat{\lambda}$, there are d degrees of freedom remaining. The d-SPP fitting procedure may employ the empirical SVF for this purpose.

d auxiliary parameters may be defined as $$\tau_i = \frac{q_{1i}}{q_{2i}} \text{ and } i \in [1, d].$$

To further expedite the fitting procedure, the following constraint may be imposed:

$$\tau_i = \tau_j \forall i, j \in [1, d] \quad \text{Equation (22)}$$

This may allow for the fit to the empirical SVF be performed as a function of a single parameter, say $\tau_x$, such that $$\tau_i = \tau_x, i \in [1, d] \quad \text{Equation (23)}$$

That is, a constant ratio between the parameters $q_{1i}$ and $q_{2i}$ for each of the individual SPPs comprising the d-SPP may be maintained. This imposition may reduce the remaining degrees of freedom from d down to 1 and allow for greatly expediting the search process while still capturing a vast range of empirical SVF behaviors for a given set of IDC parameters.

The final step in the d-SPP fitting procedure may be to perform a fit (e.g. based on absolute error minimization) of the d-SPP queue occupancy SVF approximation to that of the empirical SVF with respect to the remaining parameter $\tau_x$. That is, $\tau_x$ may be varied, and for each value of $\tau_x$, the theoretical system occupancy for the d-SPP/M/1 queue may be computed and compared against the empirical SVF of the system occupancy derived from the output of the virtual queue. The implementation and operation of the virtual queue for the d-SPP fitting procedure may be identical to that of the single SPP case (i.e. virtual queue as depicted as 112 in FIG. 4 for the single SPP case). However, when the packet arrival process is LRD, the empirical PDF output 128 from the virtual queue 112 may be expected to have a different (more complex) form than the simple two slopes depicted in the log-scale graph (e.g., FIG. 7). Thus, as in the single SPP case, the goal of the queue occupancy SVF estimator (depicted as item 114 in FIG. 4 for the single SPP case), may be to provide a fit of the theoretical d-SPP/M/1 queue to an empirical SVF derived from the output (empirical PDF) of the virtual queue and pass the resulting parameters of this empirical SVF fit to the final SPP parameter estimator. However, because $\overline{k_1}^*$ and $\overline{k_2}^*$ may be outputs from the IDC estimator, $\hat{\lambda}$ may be provided by the packet arrival rate monitor, and the remaining d-degrees of freedom may have been reduced to one degree of freedom (i.e. parameter $\tau_x$) by equation (23), the queue occupancy SVF estimator may need to only provide $\tau_x$ as its output.

That is, once there may be $\hat{\lambda}$ (the output from the packet arrival rate monitor), $\overline{k_1}^* = \{\hat{k}_{1i}\} = \{\hat{k}_{11}, \hat{k}_{12}, \ldots, \hat{k}_{1d}\}$ and $\overline{k_2}^* = \{\hat{k}_{21}, \hat{k}_{22}, \ldots, \hat{k}_{2d}\}$ (the outputs from the outputs from the d-SPP IDC estimator), and $\hat{\tau}_x = q_{1i}/q_{2i}$ (the output from the queue occupancy SVF estimator), the SPP parameters may be computed. $\tau_x$ may define only the ratio of all the transition rate pairs. The actual transition rates may have yet to be estimated.

To do so, the d-SPP parameter estimator (analogous to 116 of FIG. 4 for the single SPP case) may compute the complete set d-SPP parameters as follows:

$$\text{Set } \hat{\lambda}_P = \hat{\lambda} - \sum_{i=1}^{d} \sqrt{\frac{\hat{k}_{1i}\hat{k}_{2i}}{\hat{\tau}_x}} \text{ and } \hat{\alpha}_i = (1+\hat{\tau}_x)\sqrt{\frac{\hat{k}_{1i}\hat{k}_{2i}}{\hat{\tau}_x}} \quad \text{Equation (24)}$$

Then  Equation (25)

$$\hat{\lambda}_{2i} = \begin{cases} \hat{\lambda}_P, & i=1 \\ 0, & i=2,\ldots,d \end{cases}$$

$$\hat{\lambda}_{1i} = \hat{\lambda}_{2i} + \hat{\alpha}_i, i=1,2,\ldots,d$$

and $$\hat{q}_{2i} = \frac{\hat{k}_{2i}}{1+\hat{\tau}_x} \quad \text{Equation (26)}$$

$$\hat{q}_{1i} = \hat{k}_{2i} - \hat{q}_{1i}$$

An issue that may arise in the search for $\hat{\tau}_x$ (performed by the queue occupancy SVF estimator) may be the amount of time it may take to compute the d-SPP/M/1 system occupancy SVF corresponding to each value of $\hat{\tau}_x$ used in the iterative search. The theoretical d-SPP/M/1 system occupancy may require many roots finding operations and consequently may represent a bottleneck to the performance of an iterative search routine. To get around this issue, a decomposition based approximation to the exact d-SPP/M/1 system occupancy SVF may be used because the approximation may be computed significantly faster. Such decomposition may only be valid when the timescale ratio a in equation (16) may be sufficiently large.

The d-SPP may have $N=2^d$ total states. The states of the d-SPP may be labeled according to the following convention:

State1: all SPPs in state 1
State2: $SPP_1$ in state 2, all other SPPs in state 1
State3: $SPP_1$ in state 1, $SPP_2$ in state 2, all other SPPs in state 1
State4: $SPP_1$ in state 2, $SPP_2$ in state 2, all other SPPs in state 1
State5: $SPP_1$ in state 1, $SPP_2$ in state 1, $SPP_3$ in state 2, all other SPPs in state 1
State6: $SPP_1$ in state 2, $SPP_2$ in state 1, $SPP_3$ in state 2, all other SPPs in state 1
State N: all SPPs in state 2

Because Poisson rates may be additive, the d-SPP may have the following Poisson rates associated with each state:

$$\beta_1 = \lambda_{11} + \lambda_{12} + \lambda_{13} \ldots + \lambda_{1d} \quad \text{Equation (27)}$$

$$\beta_2 = \lambda_{21} + \lambda_{12} + \lambda_{13} \ldots + \lambda_{1d}$$

$$\beta_3 = \lambda_{11} + \lambda_{22} + \lambda_{13} \ldots + \lambda_{1d}$$

$$\beta_4 = \lambda_{21} + \lambda_{22} + \lambda_{13} \ldots + \lambda_{1d}$$

$$\beta_5 = \lambda_{11} + \lambda_{12} + \lambda_{23} \ldots + \lambda_{1d}$$

$$\beta_6 = \lambda_{21} + \lambda_{21} + \lambda_{23} \ldots + \lambda_{1d}$$

$$\vdots$$

$$\beta_N = \lambda_{21} + \lambda_{22} + \lambda_{23} \ldots + \lambda_{2d}$$

where $\beta_k$ is the Poisson rate of the k-th state of the d-SPP, $\lambda_{1i}$ is the rate of the i-th SPP in its first state, $\lambda_{2i}$ is the rate of the i-th SPP in its second state. Maintaining the convention that the SPP indexes are sorted by increasing timescale, the smallest timescale SPP ($SPP_1$) may be the SPP with transition rates $q_{11}$ and $q_{21}$. The d-SPP may be temporarily operating an SPP with parameters $q_{11}$, $q_{21}$, $\beta_1$, and $\beta_2$ for some proportion of time (when all the longer time-scale SPPs may be in their first state while $SPP_1$ toggles), and then transitioning to another SPP, with parameters $q_{11}$, $q_{21}$, $\beta_5$, and $\beta_6$ for some proportion of time (where $SPP_3$ may be in its second state when the remaining longer timescale SPPs may be in state 1 while $SPP_1$ toggles or any other combination of the $2^{d-1}$ possible states being held by the longer timescale SPPs while $SPP_1$ toggles). Using this visualization, a decomposition approximation may be applied for which the d-SPP/M/1 system occupancy may be approximated as $$P(X>n) = \sum_{k=1}^{2^{d-1}} P(S_2 = s_2[k]) \ldots \quad \text{Equation (28)}$$

$$P(S_N = s_N[k])[C_3^{(k)}(z_3^{(k)})^{-n} + C_4^{(k)}(z_4^{(k)})^{-n}]$$

where $S_i$ is the state of the i-th SPP and $s_i[k]$ (where $s_i[k]\in[1,2]$) is the value the i-th SPP may take on for the overall d-SPP to be operating as the k-th of the $2^{d-1}$ temporary SPP queues that it may transition to. For each proportion of time where the d-SPP may temporarily be functioning as an SPP with transition rates $q_{11}$, $q_{21}$, and aggregate Poisson rates $\beta_k$, $\beta_{k+1}$ the d-SPP/M/1 queue may temporarily be operating as an SPP/M/1 queue with source SPP having these respective parameters. For example, when all $s_i[k]=1$, $i=2, 3, \ldots, 2^{d-1}$, all the longer timescale SPPs (i.e. those other than $SPP_1$) may be in state 1, and the d-SPP/M/1 queue may operate as an SPP/M/1 queue with source SPP defined by $q_{11}$, $q_{21}$, $\beta_1$, and $\beta_2$. When all $s_i[k]=2$, $i=2,3,\ldots,2^{d-1}$, all the longer timescale SPPs may be in state 2 and the d-SPP/M/1 may operate as an SPP/M/1 queue with source SPP defined by $q_{11}$, $q_{21}$, $\beta_{N-1}$, and $\beta_N$. The other states may follow accordingly. This decomposition approximation may rely on the fact that for any permutation of the longer timescale SPPs being in a particular state, the smallest timescale SPP ($SPP_1$) may toggle much more rapidly which may cause the corresponding SPP/M/1 queue to reach steady-state before any of the longer timescale SPPs may change state. The term $[C_3^{(k)}(z_3^{(k)})^{-n} + C_4^{(k)}(z_4^{(k)})^{-n}]$ may be the system occupancy SVF of the k-th SPP/M/1 queue (where $1<k<2^{d-1}$) with source SPP parameters $q_{11}$, $q_{21}$, $\beta_k$, and $\beta_{k+1}$. The probability that $SPP_i$ is in state 1 may be $(q_{2i}/k_{2i})$ and the probability that $SPP_i$ is in state 2 may be $(q_{1i}/k_{2i})$. Using these values to compute each of the $P(S_i=s_i[k])$ in equation (28) combined with solving $[C_3^{(k)}(z_3^{(k)})^{-n}+C_4^{(k)}(z_4^{(k)-n})]$ for each of the $2^{d-1}$ SPP/M/1 queue system occupancy SVFs required to calculate equation (28), the d-SPP/M/1 queue system occupancy SVF may be approximated much faster using equation (28) than computing the exact solution. This approximation may in turn be used by the queue occupancy SVF estimator to expedite the search for parameter $\hat{\tau}_x$.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in a illustrative rather than restrictive sense.

What is claimed is:

1. A method performed by a processor associated with a computer comprising the steps of:
measuring, by the processor, characteristics of a packet arrival process at a network element;
establishing a virtual queue for packets arriving at the network element; and
modeling the packet arrival process based on the measured characteristics and a computed performance of the virtual queue, the modeling including:
specifying a service rate of a packet service process at the virtual queue;
generating an empirical distribution function associated with the virtual queue based on the measured characteristics and the specified service rate;
estimating characteristics of a curve that approximates the empirical distribution function; and
determining parameters of the model packet arrival process based on the characteristics of the curve.

2. The method of claim 1, wherein the empirical distribution function is at least one of an empirical probability density function and a survivor function.

3. The method of claim 1, wherein the curve is a sum of geometric terms.

4. The method of claim 3, wherein the sum of geometric terms is a system occupancy distribution of a queuing system sourced by the modeled packet arrival process.

5. The method of claim 1, wherein the specified service rate corresponds to an exponentially distributed service process.

6. The method of claim 1, further including the step of:
optimizing at least one of an output link capacity and a buffer size associated with a network element in the network based on the parameters of the model packet arrival process.

7. The method of claim 6, further including the step of:
optimizing at least one of an output link capacity and a buffer size associated with the queue based on a performance objective.

8. The method of claim 7, wherein the performance objective is at least one of a desired bound on maximum service delay and a desired bound on maximum loss of packets.

9. The method of claim 1, wherein the specified service rate corresponds to an exponentially distributed service process.

10. The method of claim 1, wherein the model packet arrival process is a Markov Modulated Poisson Process.

11. The method of claim 10, wherein the Markov Modulated Poisson Process is a switched Poisson process.

12. The method of claim 10, wherein the Markov Modulated Poisson Process is a superposition of d switched Poisson processes.

13. The method of claim 12, wherein each switched Poisson process in the superposition of d switched Poisson processes operates in a different time scale.

14. A method performed by a processor associated with a computer comprising the steps of:
measuring, by the processor, characteristics of a packet arrival process at a network element;
establishing a virtual queue for packets arriving at the network element;
specifying a packet service rate of a packet service process at the virtual queue;
substituting exponentially distributed service times in place of the actual service times of the packets arriving to the virtual queue;
generating an empirical distribution function associated with the virtual queue based on the measured characteristics and the specified service rate;
estimating characteristics of a curve that approximates the empirical distribution function; and
optimizing at least one of an output link capacity and a buffer size associated with the queue based on the approximation curve.

15. A network element comprising:
an egress queue; and
a monitoring module operably connected to the egress queue, the monitoring module including:
a monitor for measuring characteristics of a packet arrival process associated with packets arriving at the egress queue;
a virtual queue for simulating the egress queue and determining virtual queue occupancy values when exponentially distributed services times are substituted for the actual services times of arriving packets;
a function generator for generating an empirical distribution function based on the measured characteristics and the virtual queue occupancy values; and
a parameter estimator for estimating parameters of a model packet arrival process based on the likelihood function and the measured characteristics.

16. The network element of claim 15, wherein the measured characteristics include a packet arrival tally, an average packet arrival rate, and an Index of Dispersion of Counts of a packet arrival process.

17. The network element of claim 15, wherein the function generator is adapted to generate the empirical distribution function based on the packet arrival tally.

18. The network element of claim 15, wherein the parameter estimator is adapted to estimate parameters based on the average packet arrival rate.

19. The network element of claim 15, wherein the parameter estimator is adapted to estimate characteristics of a curve that approximates the empirical distribution function and to determine parameters of the model packet arrival process based on the estimated curve characteristics.

20. The network element of claim 19, wherein the curve is specified as a sum of geometric terms.

21. The network element of claim 15, wherein the virtual queue is adapted to determine virtual queue occupancy values based on an externally specified packet service rate.

22. The network element of claim 21, wherein the specified packet service rate corresponds to an exponentially distributed service process.

23. The network element of claim 15, wherein the empirical distribution function is at least one of an empirical probability distribution function and a survivor function.

24. The network element of claim 15, wherein the network element is adapted to optimize at least one of an output link capacity and a buffer size associated with an egress port and/or an egress queue in the network element based on the parameters of the model packet arrival process.

25. The network element of claim 24, wherein the network element is further adapted to optimize at least one of an output capacity and a buffer size associated with the egress port and/or egress queue in the network element based on a performance objective.

26. The network element of claim 25, wherein the performance objective is at least one of a desired minimum service delay and a desired minimum loss of packets.

27. The network element of claim 15, wherein the model packet arrival process is a Markov Modulated Poisson Process.

28. The network element of claim 27, wherein the Markov Modulated Poisson Process is a switched Poisson process.

29. The network element of claim 27, wherein the Markov Modulated Poisson Process is a superposition of d switched Poisson processes.

30. The network element of claim 29, wherein each switched Poisson process in the superposition of d switched Poisson processes operates in a different time scale.

31. A method performed by a processor associated with a computer comprising the steps of:
- generating, by the processor, a simulated service time for a packet arriving at a virtual queue based on an exponentially distributed random number;
- assigning the packet a departure time based on the simulated service time;
- observing occupancy of the virtual queue to generate a model of a packet arrival process associated with the packet, the observing comprising:
  - observing a mean rate of the packet arrival process;
  - observing an Index of Dispersion of Counts; and
  - estimating parameters of the packet arrival process based at least on the observed mean rate of the packet arrival process and on the observed Index of Dispersion Counts.

32. The method of claim 31, wherein a mean of the exponentially distributed random number is specified by a user.

33. The method of claim 31, wherein the packet arrival process is a Markov Modulated Poisson Process.

34. The method of claim 33, wherein the Markov Modulated Poisson Process is a switched Poisson process.

35. The method of claim 34, wherein the Markov Modulated Poisson Process is a superposition of d switched Poisson processes.

36. The method of claim 35, wherein each switched Poisson process in the superposition of d switched Poisson processes operates in a different time scale.

* * * * *